United States Patent

Wright

[15] 3,648,568
[45] Mar. 14, 1972

[54] SIGNAL VALVE

[72] Inventor: Lee A. Wright, Kettering, Ohio
[73] Assignee: Mosier Industries, Inc., Dayton, Ohio
[22] Filed: Mar. 9, 1970
[21] Appl. No.: 17,746

[52] U.S. Cl. ..................................................92/5
[51] Int. Cl. ..........................F01b 25/26, F01b 31/12
[58] Field of Search .............91/1, 402, 357, 403; 92/5

[56] References Cited

UNITED STATES PATENTS

| 1,108,952 | 9/1914 | Wales | 91/1 |
| 1,448,531 | 3/1923 | Gow | 91/403 |
| 1,557,684 | 10/1925 | Gottschalk | 91/402 X |
| 2,314,398 | 3/1943 | Hoch | 91/403 X |
| 2,773,484 | 12/1956 | Peek | 91/402 X |

FOREIGN PATENTS OR APPLICATIONS

| 585,819 | 10/1933 | Germany | 91/403 |

Primary Examiner—Edgar W. Geoghegan
Assistant Examiner—Irwin C. Cohen
Attorney—Greist, Lockwood, Greenawalt & Dewey

[57] ABSTRACT

The signal valve indicates when a piston, movable in a cylinder, is moved to one end of the cylinder. The signal valve includes a housing mounted on the cylinder and having first and second passageways therein which communicate with the interior of the cylinder through first and second ports in the side wall of the cylinder. The first passageway extends through the housing between the first port and a fluid pressure sensing device. The second passageway terminates within the housing. A valve member is positioned for movement within the housing and has a first end adapted to close the first passageway and a larger second end. When the same pressure is acting on both ends of the valve member, the force on the second end is greater than the force on the first end to move the valve member to close the first passageway. When the piston is moved to one end of the cylinder between the ports, the fluid pressure acting on the piston is admitted through the first port into the portion of the first passageway between the first port and the valve member to establish a force on the valve member for moving the valve member to open the first passageway to permit operating fluid to flow through the first passageway to indicate that the piston is at the one end of the cylinder. A vent passage in the housing vents the portion of the first passageway in communication with the pressure sensing device when the first passageway is closed by the valve member.

4 Claims, 2 Drawing Figures

Patented March 14, 1972
3,648,568
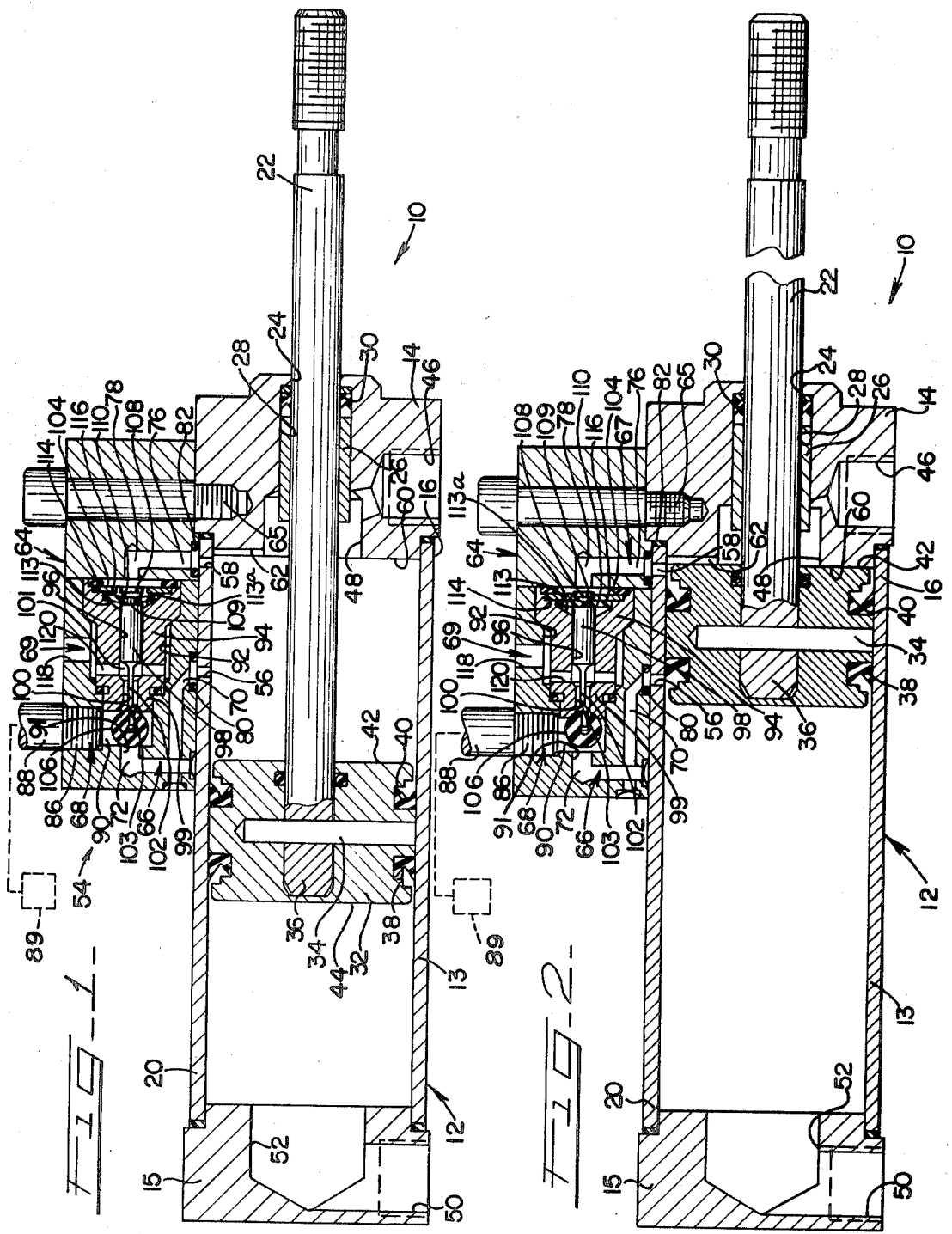
INVENTOR
LEE A. WRIGHT
BY Reid, Lockwood, Greenawalt & Dewey
ATT'YS.

SIGNAL VALVE

The present invention relates to a signal valve for indicating when a piston, movable in a cylinder, is moved by the pressure of an operating fluid to one end of the cylinder. More specifically, the present invention is directed to a signal valve which can be used for monitoring or controlling the movement of a piston in a cylinder, such as the piston in a pneumatic piston and cylinder mechanism. For example, in one application, the signal valve of the present invention can be utilized for monitoring the movement of a piston in a cylinder by operating a whistle or other fluid pressure operated, signal producing mechanism which produces a signal indicating the piston is at one end of the cylinder. In another application, the signal valve can be utilized to send a signal to a control system which controls the flow of pressurized fluid to either end of the cylinder. In this respect, a group of piston and cylinder mechanisms, each with a signal valve of the present invention mounted at each end of each cylinder, can be controlled by a control system which, upon receiving appropriate signals from the signal valves, will cause operation of the piston and cylinder mechanisms in sequence or in unison depending on the mode of operation desired.

According to one preferred embodiment of the present invention, the signal valve includes a housing which is mounted at one end of a cylinder having a piston movable therein and having first and second ports in the side wall of the cylinder near one end of the cylinder. The first port is located at a point spaced from the one end of the cylinder and the second port is located at a point adjacent the one end of the cylinder. The housing has a first passageway which communicates at a first end thereof with the first port and a second end which is adapted to communicate the first passageway with a fluid pressure sensing device, such as a whistle. The housing also has a second passageway which has a first end communicating with the interior of the cylinder through the second port and a second end which terminates within the housing. A valve member is positioned within a cavity in the housing, has a first and a second end, and is movable within the housing to and from a passageway closing position where the first end of the valve member closes the first passageway to block the flow of fluid from the cylinder to the second end of the first passageway. The cavity communicates with the second end of the second passageway so that fluid in the second passageway acts against the second end of the valve member. Moreover, the second end of the valve member is designed to present a larger surface area to fluid acting thereon than is presented by the first end so that when the fluid pressure in both passageways is substantially the same, the force on the second end of the valve member is greater than the force on the first end to bias the valve member to the passageway closing position. However, when the fluid pressure in the first passageway is significantly greater than the fluid pressure in the second passageway by reason of the piston having been moved by the pressure of the operating fluid acting thereon to a position between the first and second ports, and the movement of the piston is stopped in this position, the first end of the valve member is moved away from the first passageway so that the pressure of the operating fluid is communicated through the first passageway to the second end thereof to allow the pressure of the operating fluid to provide a fluid pressure signal indicating that the piston is at the one end of the cylinder.

An important object of the present invention is to provide a stroke signal valve which will indicate the completion of a stroke of a piston in a cylinder.

Another object of the present invention is to provide a signal valve which will apply the pressure of the operating fluid in a piston and cylinder mechanism to a pressure sensing device when the piston in the cylinder completes a forward stroke and is then at one end of the cylinder, and which will relieve the pressure from the pressure sensing device when the piston leaves the one end of the cylinder at the beginning of a return stroke.

Another object of the present invention is to provide a signal valve for indicating when a piston movable in a cylinder is at one end of the cylinder and which is adapted to operate a fluid operated pilot valve, a small fluid actuated piston and cylinder mechanism, or a fluid operated pilot switch.

Another object of the present invention is to provide a signal valve at each end of a cylinder of a piston and cylinder mechanism in combination with a double acting pilot valve for controlling the flow of fluid to either end of the cylinder to cause oscillation of the piston of the mechanism.

Another object of the present invention is to provide individual signal valves for each one of a group of cylinders having pistons movable therein, the signal valves being adapted to indicate, by means of a fluid pressure signal, when the piston in each cylinder is moved to one end of the cylinder, and the fluid pressure signal is adapted to be utilized in a fluidic logic control circuit for operating main valves controlling the flow of operating fluid to either end of the cylinder to move the piston in each cylinder from one end to the other end of each cylinder in sequence or in unison.

Another object of the present invention is to provide a signal valve in which movement of a valve member is controlled by fluid pressure acting on each end of the valve member and the valve member is designed to present a larger surface area at one end thereof to the fluid acting thereon than is presented by the other end so that, when substantially the same fluid pressure is applied to both ends of the valve member, the force acting on the end is greater than the force acting on the other end to bias the valve member toward the other end.

Another object of the present invention is to provide a signal valve which is operated by fluid flowing through ports or holes in the side wall of a cylinder to indicate the piston of a piston movable in the cylinder.

Still another object of the present in invention is to provide a signal valve which is adapted for easy mounting on a cylinder of a fluid operated piston and cylinder mechanism and which requires no external source of pressure for the operation thereof.

These and other objects and advantages of the present invention including the manner of their attainment, will become more apparent from the following detailed description of a preferred embodiment of the invention taken in conjunction with the accompanying drawings wherein:

FIG. 1 is a sectional view of the signal view of the present invention mounted on one end of a piston and a cylinder mechanism and showing the piston of the mechanism situated in an intermediate position between the ends of the cylinder; and, FIG. 2 is a sectional view, similar to FIG. 1, and showing the piston situated at one end of the cylinder.

Referring now to the drawings in greater detail, a piston and cylinder mechanism is generally indicated at 10 in FIGS. 1 and 2. The mechanism 10 includes a cylinder 12 having a cylindrical side wall portion 13 and two end caps 14 and 15. The end cap 14 closes one end 16 of the cylinder 12 and the end cap 15 closes the opposite end 20 of the cylinder. A piston rod 22 is received through an opening 24 in the end cap 14 and is suitably journaled in a bearing 26 mounted in a bore 28 in the end cap 14. A suitable seal 30 is positioned in the bore 28 between the bearing 26 and the opening 24 to seal the cylinder from the ambient atmosphere.

A piston 32 is situated within the cylinder 12 and is connected by a cross pin 34 to the end 36 of the piston rod 22 received in the cylinder 12. The piston 32 is provided with suitable seals 38 and 40 on the outer periphery thereof for sealing the rod side 42 of the piston 32 from the other side 44 of the piston.

The end cap 14 has a port opening 46 which is adapted for connection to a fluid line (not shown) which supplies and relieves pressurized fluid to and from the interior of the cylinder 12 through the port opening 46 and an internal bore 48 in the end cap 14. In like manner, the end cap 15 has a port opening 50 adapted to connect with a fluid line (not shown) for supplying and relieving pressurized fluid to and from the cylinder 12 through the port opening 50 and a bore 52 in the end cap 15. With this arrangement, pressurized fluid can be applied to one side 42 or 44 of the piston 32 while pressurized fluid is relieved from the other side 44 or 42 of the piston 32. The piston and cylinder mechanism construction described so far is conventional and forms no part of the present invention.

The signal valve of the present invention is generally indicated at 54 and is mounted on the one end 16 of the cylinder 12. To enable the valve 54 to be operated by the operating fluid used to move the piston 32, the side wall 13 of the cylinder 12 is provided with a first port or hole 56 which is located at a point spaced from the end 16 of the cylinder 12 and a second port or hole 58 which is located at a point adjacent the end 16 of the cylinder 12. Also, the surface 60 of the end cap 14 within the cylinder 12 has a slot 62 which is located near the second port 58. The slot 62 is adapted to communicate the port 58 with the internal bore 48 and the port opening 56 for relieving fluid pressure from, or applying fluid pressure to, the port 58 when the piston 32 has been moved to the end 16 of the cylinder 12 with the rod side 42 of the piston 32 flush against the inner surface 60 of the end cap 14. The signal valve 54 is adapted to utilize the fluid pressure applied through the ports 56 and 58 to indicate the position of the piston 32 in the cylinder 12. More specifically, the signal valve 54 will produce a signal in the form of fluid pressure to indicate when the piston 32 has been moved, by the pressure of the operating fluid acting on the other side 44 of the piston, to the one end 16 of the cylinder 12 as shown in FIG. 2.

The signal valve 54 includes a housing 64 which is secured by a suitable fastener 65 to the end cap 14. The housing 64 has four passages or passageways 66–69 formed therein. The first passage 66 has a first end 70 in registry with the port 56 and a second end 72 which terminates within the housing 64. The second passage is spaced from the first passage and has a first end 76 in registry with the second port 58 and a second end 78 which terminates within the housing 64. As shown, "O" rings 80 and 82 are positioned between the housing 64 and the cylinder 12 to provide a seal at the points of registry between the ports 56 and 58 and the passages 66 and 67.

The third passage 68 has a first end 86 which is adapted for connection to a fluid line 88 leading to a fluid pressure sensing device generally indicated with phantom lines at 89 and a second end 90 terminating within the housing 64. An opening 91 is provided in the housing 64 between the second end 72 of the first passage 66 and the second end 90 of the third passage 68.

The housing 64 also has a stepped bore 92 in which an insert 94 is received. The insert 94 has an internal cavity 96 in which a valve member 98 is positioned. One end 99 of the insert 94 has an opening 100 for communicating one end 101 of the cavity 96 with the second end 90 of the third passage 68. As shown, the valve member 98 has a stem portion 102 at a first end 103 thereof which extends through the opening 100 into the second end 90 of the third passage 68. The opposite or second end 104 of the cavity 96 is larger than the first end 101 and communicates with the second end 78 of the second passage 67. An elastomeric ball seal 106 is fitted on the stem portion 102 and is positioned for movement in and transversely of the second end 90 of the third passage 68 to open and close the opening 91 between the first passage 66 and the third passage 68 and to close and open the opening 100 between the third passage 68 and the cavity 96 in the insert 94.

As shown, a second end 108 of the valve member 98 has a reduced diameter portion 109 which mounts and locates a flexible diaphragm 110 on the valve member 98 and within the enlarged end 104 of the cavity. It is to be noted that the outer periphery of the diaphragm 110 is not clamped so that the diaphragm 110 is allowed to float freely in the enlarged end 104 and thereby permit flexing of the diaphragm at low pressure differentials.

The second or enlarged end 104 of the cavity 96 is defined by a stepped bore portion in the insert 94 and the diaphragm 110 is received in the space formed by the smallest radius annular step 113. A portion 113a of the annular step 113 tapers toward the portion of the cavity 96 which slidably receives the valve member 98. In this way, a frustoconical space is provided in which the diaphragm 110 can flex. The larger radius annular step 114 receives and holds a washer 116 press fitted therein such that the washer 116 holds the diaphragm 110 within the annular step 113. When the valve member 98 is moved to open the opening 91 between the first passage 66 and the third passage 68, the diaphragm 110 is moved against the washer 116 and the washer 116 serves to straighten any conical set that may have developed in the diaphragm 110 when the valve member 110 was in a position closing the opening 91 between the first passage 66 and the third passage 68.

The fourth or vent passage 69 is defined by an aperture 118 in the housing 64, radial apertures 120 in the insert 94, the end 101 of the cavity 96 and the opening 100 in the one end 99 of the insert. When the valve member 98 is in the position shown in FIG. 1, the third passage 68 is vented by the fourth passage 69 to atmosphere, or to a reservoir connected to the aperture 118, via the opening 100, the cavity 96, the radial apertures 120 and the aperture 118.

Referring now to the operation of the signal valve 54, it will be understood that various fluids, e.g., a gas or a liquid, can be used for the operating fluid in the piston and cylinder mechanism 10 so that the signal valve 54 can be utilized with either a pneumatic or a hydraulic mechanism 10. However, when compressed air is used as the operating fluid, a special reservoir is not required for the air vented through the fourth passage 69. Therefore, the operation of the signal valve 54 will now be described when used on a pneumatically operated piston and cylinder mechanism 10 in which compressed air is utilized for the operating fluid.

When the piston is in the position shown in FIG. 1, the valve 54 is "closed" by reason of the elastomeric ball seal 106 closing the opening 91 between the first passage 66 and the third passage 68. In this position of the piston 32, it will be noted that the pressure of the fluid on the rod side 42 of the piston 32 is applied through both ports 56 and 58 to the first and second ends 103 and 108 of the valve member 98. With the diaphragm 110 at the second end 108 presenting a larger surface area to the fluid acting on the second end 108 than is presented by the first end 103 to the fluid acting thereon, i.e., than by the portion of the ball seal 106 facing the opening 91, the force on the second end 108 of the valve member 98 tending to move the valve member 98 to the left is greater than the force on the first end 103 of the valve member 98 tending to move it to the right. Consequently, the valve member 98 is biased to the left to a "closed" position where the ball seal 106 at the first end 103 closes the opening 91 between the first passage 66 and the third passage 68.

It will be understood that the piston 32 will be in the position shown in FIG. 1 during a return stroke of the piston 32 toward the end cap 15 and during a forward stroke of the piston 32 toward the end cap 14. On a return stroke, pressurized air is admitted through the port opening 46 to the interior of the cylinder on the rod side 42 of the piston 32 and forces the piston 32 toward the end cap 15. Of course, at the same time, the fluid line connected to the port opening 50 in the end cap 15 is vented to atmosphere. At this time, the pressure in the cylinder 12 between the rod side 42 of the piston 32 and the inner surface 60 of the end cap 14 is greater than atmospheric pressure. However, since the same pressure is applied to both ends 103 and 108 of the valve member 98 through ports 56 and 58 and passages 66 and 67, a greater force is developed at the second end 108 as described above, and this force holds the valve member 98 in the "closed" position.

After the piston 32 reaches the second end 20 of the cylinder 12, the air line leading to the port opening 46 is vented to atmosphere and air pressure is now applied through the port opening 50 to the other side 44 of the piston 32 so that the piston 32 is forced to the right toward the end cap 14. When this occurs, the pressure of the air on the other side 44 of the piston 32 will be greater than the pressure of the air being forced out of the cylinder 12 through the port opening 46. However, this pressure of the air on the rod side 42 of the piston 32 is applied to both ends 103 and 108 of the valve member 98 through the ports 56 and 58, and the valve member 98 will remain in the "closed" position by reason of the larger force acting at the second end 108 of the valve member 98, at least until the piston 32 is moved to the end 16 of the cylinder 12 as shown in FIG. 2.

When the piston 32 completes its forward stroke and is at the one end 16 of the cylinder 12, the periphery of the piston 32 is situated between the first port 56 and the second port 58, and the greater air pressure on the other side 44 of the piston 32 is now communicated through the port 56 and the first passage 66 to the ball seal 106 at the first end 103 of the valve member 98. At the same time, any air pressure on the rod side 42 of the piston 32 is relieved from the cylinder 12 via the slot 62, the bore 48 and the port opening 46. Since the pressure of the air acting on the other side 44 of the piston is much greater than atmospheric pressure, a force is now established at the first end 103 of the valve member 98 which is greater than the force on the second end 108 of the valve member 98 to cause movement of the valve member 98 to an "open" position where the opening 91 between the first passage 66 and the third passage 68 is open to allow the pressurized air to flow through the first and third passages 66 and 68 to the fluid line 88. At the same time, the elastomeric ball seal closes the opening 100 in the insert 94 to close the fourth passage 69 which normally vents the third passage 68 to atmosphere.

In one embodiment of the signal valve of the present invention, device 89 is a whistle or other fluid actuated sound producing device so that the pressurized air which flows to the line 88, when the piston 32 is at the one end 16 of the cylinder 12, will act upon the whistle or other sound producing device to produce a sound which indicates that the piston is at the one end 16 of the cylinder 12. In this position of the valve member 98, the diaphragm 110 is positioned in a plane parallel to the plane of the washer 116 and the second passage 67 is vented to atmosphere via the second port 58, the slot 62, the bore 48 and the port opening 46.

When the control valve (not shown) controlling the flow of compressed air to the cylinder and piston mechanism 10 is operated to connect the fluid line leading to the port opening 50 to atmosphere and to connect the fluid line 46 leading to the port opening 46 to the source (not shown) of compressed air, the fluid pressure acting on the second end 108 of the valve member 98 will be greater than the fluid pressure acting on the first end 103 such that the valve member 98 is moved from the "open" position to the "closed" position where the elastomeric ball seal 106 closes the opening 91 and vents the third passage 68 to atmosphere via the fourth passage 69. After the piston 32 is moved past the first port 56, to the position shown in FIG. 1, the fluid pressure acting on both ends 103 and 108 of the valve member 98 will be the same. Accordingly, the force on the second end 108 of the valve member 98 will be greater than the force on the first end 103, as described above, so that the valve member 98 remains in the " closed" position as shown in FIG. 1, until the position 32 is returned to the one end 16 of the cylinder 12.

It will be understood from the above description of the operation of the signal valve 54, that every time the piston 32 is moved to the one end 16 of cylinder 12, as shown in FIG. 2, the pressure of the operating fluid admitted to the port 56 will cause the valve member 98 to move to its "open" position to apply the pressure of the operating fluid, such as air, to the fluid line 88. Although, in one embodiment of the invention, the device 89 is a whistle, it is to be understood that the device 89 can be a double acting pilot valve which will operate a main valve (not shown) controlling the flow of pressurized fluid to the port openings 46 and 50. In such a modified embodiment of the invention, another signal valve is mounted at the other end 20 of the cylinder 12 in a similar manner to the valve 54 at the end 16, so that, when the piston 32 reaches the other end 20, the signal valve at the end 20 is "opened" to operate the pilot valve to operate the main valve to vent the port opening 46 to atmosphere and to supply pressurized fluid to the port opening 50 to initiate the forward stroke of the piston. Then, when the piston 32 advances to the one end 16 of the cylinder 12, the signal valve 54 is "opened" to cause the pilot valve to operate the main valve to vent the fluid line connected to the port opening 50 and to supply pressurized fluid to the fluid line leading to the port opening 46. In this way, reciprocation of the piston 32 can be controlled by the signal valves mounted at each end of the cylinder 12 in combination with the pilot valve and the main valve.

In another embodiment of the invention, individual signal valves are provided at each end of each cylinder in a group of piston and cylinder mechanisms. The fluid lines, corresponding to the fluid line 88 in FIGS. 1 and 2, from each signal valve are connected to a fluidic logic control circuit which is adapted to control the flow of pressurized fluid to the first and second ends of each cylinder. In this way, the pistons in each one of the piston and cylinder mechanisms can be operated in unison or in sequence, depending upon the mode of operation desired.

It is to be understood from the foregoing description that the present invention provides a signal valve which indicates, in the form of a fluid pressure signal, when a piston is at the end of a forward or return stroke in a cylinder. Furthermore, the signal valve is adapted to stop the fluid pressure signal when the piston leaves the end of the cylinder as it begins a return or forward stroke.

Accordingly, the signal valve of the present invention has a number of advantages, some of which are as follows:

1. The fluid pressure signal can be utilized to operate a number of fluid operated devices, such as an air operated pilot valve, a small air piston and cylinder mechanism, or an air operated pilot switch.

2. Individual signal valves can be mounted on each end of a cylinder and the fluid line from each valve can be connected to a double acting pilot valve for controlling the flow of compressed air to the cylinder to cause oscillation of the piston in the cylinder.

3. A group of cylinders, each with an individual signal valve at each end of each cylinder, can be utilized in combination with a fluidic logic control circuit to operate the pistons in each cylinder in sequence or in unison, depending upon the operation desired.

4. The signal valve utilizes an unbalance of the forces acting on each end of the valve member to keep the valve closed when pressure at both ends of the valve member is substantially equal and permits the valve member to open the valve when pressure is relieved from the second or diaphragm end of the valve member.

5. The utilization of spaced apart ports at one end of a cylinder in a piston and cylinder mechanism enables the signal valve to be easily adapted for use with an existing piston and cylinder mechanism merely by forming two small holes in the cylinder side wall to form the first and second ports 56 and 58.

6. The signal valve is operated by the pressure of the operating fluid used to move the piston within the cylinder so that the signal valve requires no external source of fluid pressure.

7. The simple mounting of the signal valve by means of one fastener enables the signal valve to be easily removed for maintanence and repair.

Thus, the signal valve of the present invention has numerous advantages and applications some of which have been described above and others which are inherent in the invention. Consequently, the scope of the present invention is only to be limited as necessitated by the accompanying claims.

I claim:

1. A signal valve in combination with a cylinder and piston for producing a signal in the form of fluid pressure to indicate when said piston, movable in said cylinder, is moved by the pressure of an operating fluid to one end of said cylinder, said cylinder having means at each end for admitting and relieving fluid to and from said cylinder and having in the side wall thereof a first port located at a point spaced from said one end of said cylinder and a second port located at a point adjacent said one end of said cylinder, said signal valve including a housing mounted on said cylinder adjacent said one end of said cylinder and having a passageway therein which communicates at a first end with said first port and communicates at a second end with position indicator means sensing fluid pressure, a movable valve member received within said housing and having a first end and a second end and being movable to and from a passageway closing position where said first end closes said passageway, a passage in said housing communicating at a first end with said second port and at a second end with said second end of said valve member, said second end of said valve member having means for presenting a larger surface area to the fluid acting thereon than said first end so that when the same pressure is acting on both ends of said valve member, the force of said fluid acting on said second end is greater than the force acting on said first end to bias said valve member toward said passageway closing position to close said passageway until said piston is moved by said operating fluid to a position between said first and second ports where said pressure of said operating fluid acting on said piston is communicated through said first port and said passageway to said first end of said valve member to establish a force at said first end of said valve member which is greater than the force at said second end to move said valve member away from said passageway closing position to allow said operating fluid to flow through said passageway to establish a fluid pressure signal at said second end of said passageway indicating that said piston is at said one end of said cylinder, said housing having a vent passage therein, one end of which terminates within said housing, and said housing having an opening between said passageway and said one end of said vent passage, said opening being closed by said first end of said valve member when said piston is at said position between said first and second ports, and being opened to communicate said second end of said passageway with said vent passage for venting said second end of said passageway when said valve member is in said passageway closing position.

2. A signal valve as defined in claim 1 wherein said second end of said valve member has a flexible diaphragm mounted thereon, said diaphragm forming said means for defining said larger surface area at said second end of said valve member.

3. A system for indicating when a piston, movable in a cylinder, is moved by the pressure of an operating fluid to one end of the cylinder, said cylinder having means at each end for admitting and relieving fluid to and from said cylinder and having first and second ports in the side wall thereof, said first port being located at a point spaced from one end of said cylinder and said second port being located at a point adjacent said one end of said cylinder, said system comprising a signal valve and a fluid pressure sensing means connected to said valve for transducing a fluid pressure signal to a sound for acoustically indicating the position of said piston at said one end of said cylinder, and said signal valve including a housing mounted at said one end of said cylinder and having first and second passages, each of said passages having a first end communicating with the interior of said cylinder through said first and second ports, respectively, and a second end terminating at a point within said housing, a third passage in said housing having one end in communication with said fluid pressure sensing means and a second end terminating at a point within said housing, said housing having an opening between said second end of said first passage and said second end of said third passage and having an interior cavity with a first end which is in communication with said second ends of said first and third passages and an enlarged second end which is in communication with said second end of said second passage, a movable valve member situated in said cavity and having a first end which is adapted to close said opening between said second ends of said first and third passages, and a second end positioned in said enlarged end of said cavity, said second end of said valve member having means for presenting a larger surface area to fluid acting thereon than is presented by said first end whereby, when said first passage and said second passage are both in communication with the fluid in said cylinder between one side of said piston and said one end of said cylinder through said first and second ports, the force on said valve member at said second end is greater than the force at said first end to bias said first end of said valve member toward said opening between said first passage and said third passage to close said opening until said piston is moved by the pressure of the operating fluid acting on the other side of said piston to a position between said first and second ports where said pressure of said operating fluid on said other side of said piston is communicated through said first port and said first passage to said first of said valve member to establish a force at said first end of said valve member which is greater than said force at said second end to move said first end of said valve member away from said opening to allow said operating fluid on said other side of said piston to flow through said first and third passages to supply a fluid pressure signal to said fluid pressure sensing means which then produces a sound indicating that said piston is at said one end of said cylinder.

4. A system for indicating when a piston, movable in a cylinder, is moved by the pressure of an operating fluid to one end of the cylinder, said cylinder having means at each end for admitting and relieving fluid to and from said cylinder and having first and second ports in the side wall thereof, said first port being located at a point spaced from one end of said cylinder and said second port being located at a point adjacent said one end of said cylinder, said system comprising a signal valve and a fluid pressure sensing means connected to said valve for transducing a fluid pressure signal to a sound for acoustically indicating the position of said piston at said one end of said cylinder, and said signal valve including a housing mounted at said one end of said cylinder and having first and second passages, each of said passages having a first end communicating with the interior of said cylinder through said first and second ports, respectively, and a second end terminating at a point within said housing, a third passage in said housing having one end in communication with said fluid pressure sensing means and a second end terminating at a point within said housing, said housing having an opening between said second end of said first passage and said second end of said third passage and having an interior cavity with a first end which is in communication with said second ends of said first and third passages and an enlarged second end which is in communication with said second end of said second passage, a movable valve member situated in said cavity and having a first end which is adapted to close said opening between said second ends of said first and third passages, and a second end positioned in said enlarged end of said cavity, said second end of said valve member having a diaphragm mounted thereon for presenting a larger surface area to fluid acting thereon than is presented by said first end whereby, when said first passage and said second passage are both in communication with the fluid in said cylinder between one side of said piston and said one end of said cylinder through said first and second ports, the force on said valve member at said second end is greater than the force at said first end to bias said first end of said valve member toward said opening between said first passage and said third passage to close said opening until said piston is moved by the pressure of the operating fluid acting on the other side of said piston to a position between said first and second ports where said pressure of said operating fluid on said other side of said piston is communicated through said first port and said first passage to said first end of said valve member to establish a force at said first end of said valve member which is greater than said force at said second end to move said first end of said valve member away from said opening to allow said operating fluid on said other side of said piston to flow through said first and third passages to supply a fluid pressure signal to said fluid pressure sensing means which then produces a sound indicating that said piston is at said one end of said cylinder, said housing having a vent passage therein one end of which terminates within said housing, and said housing having a second opening therein between said third passage and said vent passage, said second opening being closed by said first end of said valve member when said piston is at said position between said first and second ports, and being opened to communicate said third passage with said vent passage for venting said third passage when said valve member is in a position closing the opening between said first passage and said third passage.

* * * * *

UNITED STATES PATENT OFFICE
CERTIFICATE OF CORRECTION

Patent No. 3,648,568                    Dated  March 14, 1972

Inventor(s)  Lee A. Wright

It is certified that error appears in the above-identified patent and that said Letters Patent are hereby corrected as shown below:

Column 1, line 39, insert the word "end" after the word "first" at the end of the line.

Column 2, line 34, the word "piston" should be --position--.

Column 2, line 36, delete the word "in".

Column 8, line 20, insert the word "end" after the word "first" in the first instance.

Signed and sealed this 5th day of September 1972.

(SEAL)
Attest:

EDWARD M. FLETCHER, JR.                 ROBERT GOTTSCHALK
Attesting Officer                       Commissioner of Patents